May 16, 1939.  G. H. MORSE  2,158,476

SLIDE RULE

Filed May 9, 1938

George H. Morse
INVENTOR.

BY C. A. Snowles.
ATTORNEYS.

Patented May 16, 1939

2,158,476

UNITED STATES PATENT OFFICE 2,158,476

SLIDE RULE

George H. Morse, Arlington, Va.

Application May 9, 1938, Serial No. 206,884

2 Claims. (Cl. 235—70)

This invention relates to slide rule construction, the primary object of the invention being to provide a slide rule which may be operated to accurately determine the proper place for the positioning of the decimal point in pointing off the answer to a mathematical problem.

An important object of the invention is to provide a device of this character wherein the movable parts of the slide rule will be exceptionally sensitive to the slightest touch by the person operating the rule, but will insure against the movable elements moving, under normal conditions, with the result that perfect registration of the indicia on the cooperating elements of the slide rule may be accomplished, and a true reading insured.

Another object of the invention is the provision of means for directing pressure equally throughout the entire length of the body portion, thereby insuring against the yieldable means bending to such an extent as to impair the true operation of the slide rule.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
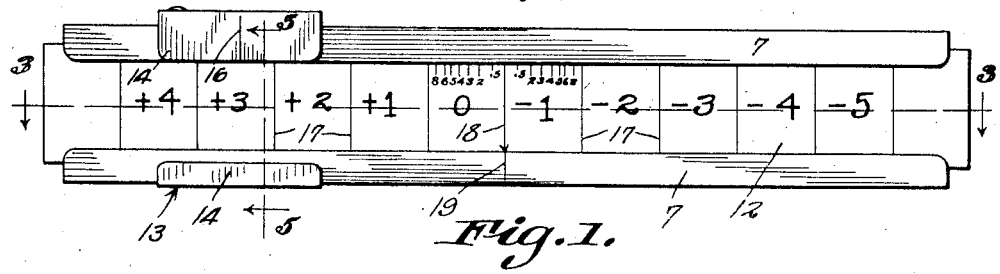
Figure 1 is an elevational view of a slide rule constructed in accordance with the invention.
Figure 2:
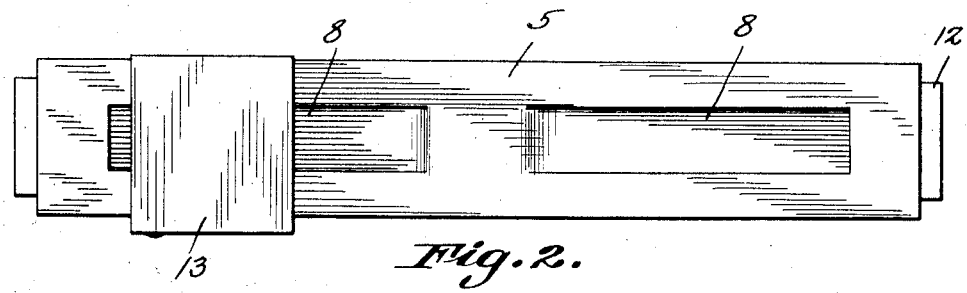
Figure 2 is a rear elevational view thereof.
Figure 3:
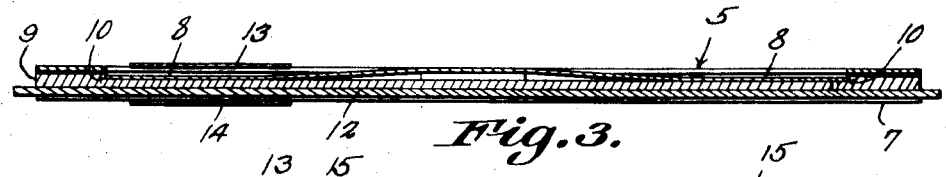
Figure 3 is a sectional view taken on line 3—3 of Figure 1.
Figure 4:
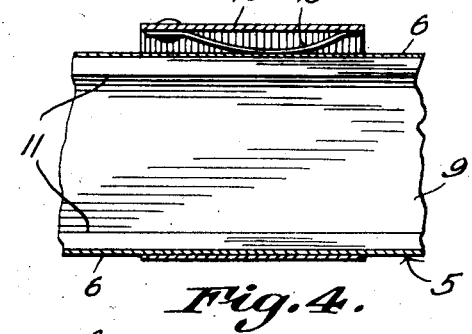
Figure 4 is a sectional view taken at right angles to Figure 3.
Figure 5:
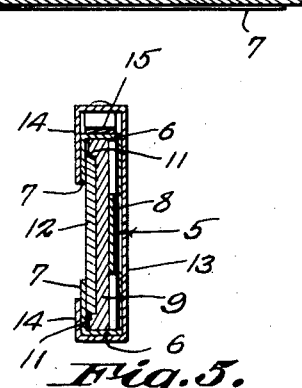
Figure 5 is a sectional view taken on line 5—5 of Figure 1.
Figure 6:
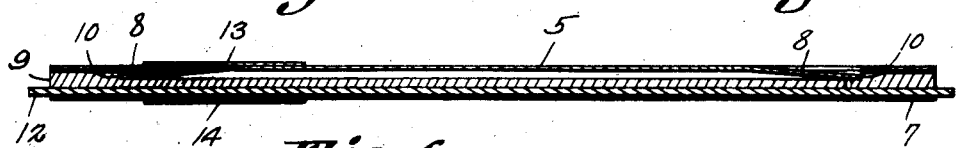
Figure 6 is a longitudinal sectional view through a modified form of the slide rule.

Referring to the drawing in detail, the body portion or housing of the slide rule is indicated generally by the reference character 5, the body portion 5 being constructed of exceptionally thin metal and formed with upstanding flanges 6 provided along the longitudinal side edges of the body portion.

As clearly shown by Figure 1 of the drawing, the flanges are turned inwardly, providing spaced longitudinal members 7 under which the slide rule, to be hereinafter more fully described, operates.

Spring fingers 8 are formed in the bottom of the body portion 5 by stamping portions from the bottom, the free ends of the spring fingers 8 being disposed near the ends of the body portion or housing 5.

Mounted within the body portion or housing 5, is a bar 9 which is of a length equal to the length of the body portion, the ends of the bar 9 being shown as flush with the ends of the body portion. This bar 9 is cut away along the rear surface thereof, providing shoulders 10 against which the ends of the spring fingers 8 engage, normally holding the bar 9 against movement longitudinally of the body portion or housing 5. This bar 9 is of a thickness less than the depth of the space between the bottom of the body portion or housing 5, and the inwardly turned portions 7 of the flanges 6, so that slight vertical movement of the bar 9 within the housing, will be permitted.

As shown, the bar 9 has its upper surface cut away providing longitudinal guides 11 for the reception of the slide rule 12, to prevent twisting of the slide rule when in operation, to impair the accuracy of the rule. As shown, the slide rule 12 is of a thickness greater than the depth of the cutaway portion 11, to the end that when the slide rule 12 is positioned on the bar, the upper surface thereof will extend above the upper surface of the bar 9, to contact with the inwardly turned portions of the flanges 6, to set up a slight binding action, to hold the slide rule in its positions of adjustment with respect to the bar.

The reference character 13 designates a rider or sliding member which is also constructed of light sheet metal material, the edges of the rider 13 being extended upwardly and inwardly as at 14, the inwardly extended portions resting on the inwardly turned portions 7 of the flanges 6.

As shown, the rider 13 is of a width greater than the width of the body portion or housing 5, and is provided with a spring 15 adapted to bear against one edge of the body portion or housing 5, normally exerting a pressure on the housing, to normally restrict movement of the rider 13.

The rider 13 is formed with a line 16, adapted to cooperate with the lines 17 of the slide rule proper. The slide rule proper is divided into lateral spaces of equal length, by the lines 17, the spaces at one side of a central line 18, being designated −1 −2 −3 −4 and −5. The spaces on the opposite side of the line 18 being designated 0 +1 +2 +3 and +4. The numeral within one of these major divisions is to be read as a logarithmic characteristic, plus or minus, as marked on the slide. The spaces adjacent to the line 18 and disposed on opposite sides of the line 18, are formed with graduations numbered 2 to 8 consecutively there being provided lines .5 also in the spaces adjacent to the line 18. These finer graduations occur only in the major spaces marked 0 and 1, namely those graduations adjacent to the line 18. The major spaces 0 and 1 are graduated longitudinally as is the ordinary slide rule, the graduations being numbered in like manner, the seventh and ninth graduations being omitted to conserve space so that the remaining numerals may be made larger than would otherwise be possible. A line 19 is formed on the housing 5 and is adapted to cooperate with the indicia 17 and 18 of the slide rule, in carrying out the purpose of the invention.

To illustrate the use of the slide rule, we will assume that the following problem is to be solved and the position of the decimal point in the answer ascertained:

$$\frac{4,200 \times .096}{3.2}$$

The digits which compose the answer and their order of arrangement is first ascertained by means of an ordinary slide rule, a calculating machine or by the usual computations using pencil and paper. These elements of the answer prove to be 1, 2, 6, 0, since the proper answer is 126.0 although we will assume that the proper place to point off has not as yet been discovered.

In operating the instrument to carry out the purpose of the invention, the slide rule 12 is first moved causing indicium 18 to be registered with indicium 19 as in Figure 1. The cursor or rider 13 is now moved so that its indicium 16 rests in the interval marked —1; or speaking more precisely, indicium 16 is brought to a position about two tenths of the distance between divisions 4 and 5 beyond 4 in the interval —1. The cursor or slide is moved to the right or into the major division —1, because the rule is so arranged that, in dealing with a factor in the numerator of a problem, which in the present instance is 4,200, this is the direction which cooperates with the positive and negative signs in the major divisions to express the effect of said factor on the characteristic sought for the answer to the problem. The intervals of the small scales at the tops of the spaces marked —1 and 0, bear the same ratio to each other as do the logarithmic mantissas of the numerals which follow them. Member 12, carrying the graduations, is now slid to the right until indicium 18 lies in register with indicium 16. Now taking up the second factor in the numerator namely .096, slide 13 is now again moved to the right until indicium 16 is again in interval —1, or more precisely it rests where 9.6 would appear in the scale at the top of interval —1 were the proper graduation applied and numbered. Again member 12 is slid to the right until indicia 18 and 16 are in register. We now come to a factor in the denominator namely 3.2 and the cursor must be accordingly moved to the left in order that the effect of such setting shall have the proper influence on the characteristic of the answer sought, as regards to its sign. Now rider 13 is moved to the left until it rests in interval 0 or more precisely at 3.2 on the small scale in interval 0. Member 12 is now moved until indicia 18 and 16 are again in register. It will now be observed that indicium 19 rests in the major interval +1. +1 is such part of the characteristic of the answer at which one would arrive, in working with logarithms in which only the mantissas of the various multipliers or divisors had been used, their characteristics having each been taken equal to zero. To ascertain the common logarithmic characteristic of the result, we have only to add the +1, thus arrived at, to the result of a mental computation which proceeds as follows. The characteristics of the several factors in our problem are determined by inspection. These characteristics are placed above or below their respective factors, for the sake of clarity, in the following expression:

$$\frac{\overset{+3}{4,200} \times \overset{\overline{2}}{.096}}{\underset{0}{3.2}}$$

The algebraic sum of the characteristics in the denominator is to be subtracted from the algebraic sum of those in the numerator. By this process we arrive at $$3-2=1 \text{ and } 1-0=+1$$

Then, to the —1 found by means of our slide rule, as above described, is to be added the +1 of the foregoing mental computation this being that portion of the characteristic of the answer which was neglected while operating the present slide rule. By this means we arrive at +2 and this is the common logarithmic characteristic of the answer which indicates that there are three digits to the left of the decimal point. The correct answer to the problem is accordingly 126. The process which has been described is followed in all cases regardless of the number and composition of the factors found in numerator or denominator of the fractional expression of the problem to be solved. A larger part of all engineering problems are most expeditiously stated in the form of such a fractional expression.

I claim:

1. In a slide rule, a housing having a bottom, side walls and inwardly directed flanges formed on the side walls of the housing, an elongated slidable graduated member mounted within the housing and confined by said flanges, an elongated backing member between the graduated member and bottom of the housing, said backing member being substantially coextensive in length with the length of the housing and adapted to contact with the graduated member, spring means interposed between the housing and backing member and secured against bodily displacement for urging the backing member against the graduated member, and means cooperating with said spring member to prevent longitudinal displacement of the backing member longitudinally of the housing.

2. In a slide rule, a housing having a bottom, side walls and inwardly directed flanges formed on the side walls of the housing, an elongated slidable graduated member mounted within the housing and confined by said flanges, an elongated backing member between the graduated member and bottom of the housing, said backing member having a groove formed in one surface thereof in which the graduated member moves, said groove being of a depth less than the thickness of the graduated member whereby the graduated member is held in contact with said flanges, by said backing strip, and spring means interposed between the housing and backing member for urging the backing member against the graduated member.

GEORGE H. MORSE.